(12) United States Patent
Fahraeus et al.

(10) Patent No.: US 7,176,896 B1
(45) Date of Patent: Feb. 13, 2007

(54) POSITION CODE BEARING NOTEPAD EMPLOYING ACTIVATION ICONS

(75) Inventors: Christer Fahraeus, Lund (SE); Petter Ericson, Malmo (SE); Linus Wiebe, Malmo (SE)

(73) Assignee: Anoto AB, Lund (SE)

( * ) Notice: Subject to any disclaimer, the term of this patent is extended or adjusted under 35 U.S.C. 154(b) by 367 days.

(21) Appl. No.: 09/652,838

(22) Filed: Aug. 30, 2000

Related U.S. Application Data

(60) Provisional application No. 60/210,654, filed on Jun. 9, 2000, provisional application No. 60/208,168, filed on May 31, 2000, provisional application No. 60/152,642, filed on Sep. 7, 1999.

(30) Foreign Application Priority Data

| | | |
|---|---|---|
| Aug. 30, 1999 | (SE) | 9903051 |
| Mar. 21, 2000 | (SE) | 0000953 |
| Apr. 5, 2000 | (SE) | 0001239 |

(51) Int. Cl.
G09G 5/00 (2006.01)

(52) U.S. Cl. ...................... 345/173; 345/179

(58) Field of Classification Search ............... 345/173, 345/168, 169, 901, 902, 179, 180, 182, 175, 345/864, 835, 840; 379/93.23; 382/189; 178/19.04, 19.05, 18.01, 18.03, 19.01
See application file for complete search history.

(56) References Cited

U.S. PATENT DOCUMENTS

| | | | |
|---|---|---|---|
| 5,051,736 A | | 9/1991 | Bennett et al. |
| 5,063,600 A | * | 11/1991 | Norwood .................. 345/173 |
| 5,194,852 A | | 3/1993 | More et al. |
| 5,442,147 A | | 8/1995 | Burns et al. |
| 5,477,012 A | | 12/1995 | Sekendur |
| 5,652,412 A | | 7/1997 | Lazzouni et al. |

(Continued)

FOREIGN PATENT DOCUMENTS

| | | |
|---|---|---|
| CN | 1129889 A | 8/1996 |

(Continued)

OTHER PUBLICATIONS

Petter Ericson and Ola Hugosson, U.S. Appl. No. 60/138,399, filed Jun. 6, 1999.

(Continued)

*Primary Examiner*—Sumati Lefkowitz
*Assistant Examiner*—Alexander S. Beck
(74) *Attorney, Agent, or Firm*—Birch, Stewart, Kolasch & Birch, LLP

(57) ABSTRACT

A system for information management consists of a product, for instance a notepad sheet, which has a writing surface (3) with a position code (5), which codes a plurality of positions on the surface, and a device, which is adapted to record the information which is being written on the writing surface by detecting the position code. Moreover, on the product there are a number of activation icons (7a–g). When such an activation icon is detected by the device, the device initiates a predetermined operation which utilizes the recorded information. Such an operation can, for instance, consist of sending the recorded information to an indicated address. A product, a device, a method and a computer program for information management are also shown.

52 Claims, 7 Drawing Sheets

U.S. PATENT DOCUMENTS

| | | | |
|---|---|---|---|
| 5,661,506 A | | 8/1997 | Lazzouni et al. |
| 5,793,361 A | * | 8/1998 | Kahn et al. .................. 345/179 |
| 5,815,142 A | | 9/1998 | Allard et al. |
| 5,852,434 A | | 12/1998 | Sekendur |
| 5,932,863 A | | 8/1999 | Rathus et al. |
| 5,937,110 A | | 8/1999 | Petrie et al. |
| 6,195,570 B1 | * | 2/2001 | Ishida ................... 379/420.04 |
| 6,208,771 B1 | | 3/2001 | Jared et al. |
| 6,252,948 B1 | * | 6/2001 | Okamoto .................... 345/173 |
| 6,327,395 B1 | * | 12/2001 | Hecht et al. ................. 382/306 |
| 6,330,976 B1 | | 12/2001 | Dymetman et al. |
| 6,686,579 B2 | | 2/2004 | Fagin et al. |
| 6,752,317 B2 | | 6/2004 | Dymetman et al. |
| 2001/0024193 A1 | * | 9/2001 | Fahraeus ..................... 345/173 |

FOREIGN PATENT DOCUMENTS

| | | |
|---|---|---|
| GB | 2306669 | 5/1997 |
| WO | 99/39277 | 8/1999 |

OTHER PUBLICATIONS

Abstract of Japanese Patent Publication No. JP10187907, Patent Abstracts of Japan, published Jul. 21, 1998, World Patent Index Accession 1994-135792.

Mats Petter Pettersson and Tomas Edsö, U.S. Appl. No. 60,157,967, filed Oct. 6, 1999.

Christer Fåhraeus, Jan Nilsson, and Patrik Söderlund, U.S. Appl. No. 09/301,856, filed Apr. 29, 1999.

"Intelligent Paper," International Conference on Electronic Publishing, Mar. 30-Apr. 3, 1998, vol. 1375, pp. 392-406.

* cited by examiner

POSITION CODE BEARING NOTEPAD EMPLOYING ACTIVATION ICONS

CROSS REFERENCE TO RELATED APPLICATIONS

This application claims the benefit of U.S. Provisional Application No. 60/152,642, filed Sep. 7, 1999; U.S. Provisional Application No. 60/208,168, filed May 31, 2000; and U.S. Provisional Application No. 60/210,654, filed Jun. 9, 2000.

FIELD OF THE INVENTION

The present invention relates to a product having at least one writing surface which is provided with a position code, which codes a plurality of positions on the writing surface to enable electronic recording of information which is being written on the writing surface, by means of a device which detects the position code. Furthermore, the invention relates to a device, a system, a computer program and a method for information management. The invention also relates to a handheld electronic device which is adapted to carry out predetermined operations at the command of a user.

BACKGROUND OF THE INVENTION

Many people use pen and paper instead of a computer to write short texts, particularly notes of telephone conversations and meetings. The reason may be that no computer is available, that both hands are needed to efficiently enter text by way of a computer keyboard, or that it takes a long time to start the right program in the computer. Even if the notes are written on a sheet of paper, people often wish to input certain parts of them to a computer, for example a note about a meeting into a digital calendar or an address into a digital address book.

U.S. Pat. No. 5,852,434 and U.S. Pat. No. 5,477,012 disclose a device enabling a user to input handwritten and hand-drawn information to a computer while the information is being written/drawn on the writing surface. The device comprises a writing surface, on which are arranged a position code cording X-Y coordinates and a special pen with a writing point for writing or drawing on the writing surface. Moreover, the pen has a light source for illuminating the position code and a CCD sensor for receiving the light reflected by the position code. The position information received by the CCD sensor is sent to a computer for processing. This device appears to require a computer to be started and a certain program to be opened before the writing on the writing surface can begin.

Similar devices are disclosed in U.S. Pat. No. 5,661,506, U.S. Pat. No. 5,051,736, U.S. Pat. No. 5,652,412 and U.S. Pat. No. 5,442,147.

U.S. Pat. No. 5,932,863 discloses how a user can access an electronic medium by reading, using a device, a symbol, code or the like in a piece of printed matter, for instance a book. The device sends a signal with the read symbol to a control unit which executes a command corresponding to the symbol.

SUMMARY OF THE INVENTION

An object of the present invention is to further simplify the management of handwritten information which is recorded electronically.

This object is wholly or partly achieved by a product according to claim 1, a device according to claim 20, a computer program according to claim 39, a system according to claim 43, and a method according to claim 45.

More specifically, according to a first aspect, the invention relates to a product having at least one writing surface which is provided with a position code, which codes a plurality of positions on the writing surface to enable electronic recording of information which is being written on the writing surface, by means of a device which detects the position code. Furthermore, the product has at least one activation icon which, when detected by the device, causes the device to initiate a predetermined operation which utilizes the information recorded by the device.

Thus, in addition to a writing surface, the product also has an activation icon by means of which the user can command the device to process the recorded information in a predetermined manner. As a result, it is not necessary for the user to press keys or buttons on the device itself or on an associated computer to which the information is transferred. Instead she uses the activation icon on the product as a means for commanding the device to process the information in the desired manner. In this way, the user can write information and control the processing thereof in a uniform manner. Moreover, the user can, immediately as the information is being created on the writing surface, define how the information is to be processed. The information need not be transferred to a computer and the user need not give the computer special commands for processing the information, which makes it possible for the user to work much in the same way as he does with paper and pen and still utilize all the facilities of electronics.

The activation icon can be likened to an icon on a computer screen, but instead of placing the screen cursor on the icon and clicking with the aid of a mouse, the user enters the command by placing the device so that it can detect the activation icon on the product. The product thus constitutes a new type of user interface for managing information which is written on a writing surface.

The written information which is recorded is in this case all information that can be produced by hand, such as text, numbers, different types of written characters, figures and drawings. It can also be referred to as graphical input.

The activation icon can be in the form of an image, a symbol, text, numbers or the like, enabling a user to understand and remember which operation is initiated when she uses the icon. The detection of the icon by means of the device can be based on the above characteristics which the user utilizes to interpret the meaning of the icon, or on other characteristics, such as some kind of symbol or code which the device detects, such as a bar code.

The activation icon can be detected before or after recording of the information that is to be used in the operation corresponding to the activation icon. According to a first alternative, first information is recorded, then the activation icon is read and after that the operation corresponding to the activation icon is initiated. According to a second alternative, first the activation icon is read, after that the information is recorded and then the operation corresponding to the activation icon is initiated.

The writing of information on the writing surface can, but need not, result in traces being left on the writing surface. If traces are left, they can be left permanently or temporarily, for instance when using ink which fades away after some time.

Ink or a colorant need not be used to write on the surface. The "writing" can also be provided by etching, burning, projecting or some other operation which leaves traces on the writing surface.

The device which detects the position code and the activation icon can be one and the same device which utilize one and the same sensor for detection. Alternatively, it can utilize two different sensors or consist of two physically separate units, of which one detects the position code and the other the activation icon. The alternative of the position code and the activation icon being detectable by one and the same device is, of course, preferred owing to the user friendliness.

In a preferred embodiment, also the activation icon is provided with the position code that is located on the writing surface. As a result, the information and the activation icon can be recorded according to the same principle, which simplifies the construction of the device and simplifies the use of the device for the user.

The position code can be designed so as to extend continuously over the writing surface and said at least one activation icon in such manner that the activation icon is detectable by means of the position code as a predetermined position on the product.

All positions of the writing surface and the activation icon are thus coded with a position code which indicates its absolute position in relation to one and the same origin which can be found on the product or outside the product. This position code is easy to apply but has its limitation by the location of the activation icon having to be determined in advance and not being movable since the device which detects the activation icon does so on the basis of its location on the product.

In a preferred embodiment, the position code on the writing surface is therefore discontinuous with the position code of said at least one activation icon. In this embodiment, like in the "continuous" embodiment, the position or positions which is/are coded by the position code on the activation icon is/are predetermined to represent the activation icon, but in contrast to the "continuous" embodiment, the position/positions is/are unrelated to the actual location of the activation icon on the product.

In a preferred embodiment, the position code with which the activation icon is provided constitutes a first subset of an absolute position code which codes coordinates for points on a imaginary surface, the first subset coding coordinates for at least one point on the imaginary surface, which point is dedicated to initiation of said operation.

The position code can advantageously code coordinates for a large number of points or positions, much larger than the number of required positions on the product with the writing surface. The coordinates for all the points coded by the position code can jointly be said to constitute an imaginary surface. This property of the position code of being able to code a very large number of points can be used to increase the functionality of the position code. More specifically, one or more points on the imaginary surface can be dedicated to initiation of a specific operation. This point always represents the same thing independently of on which product and where on this product it is used. This construction facilitates the design of a new system with many different products having a writing surface and at least one activation icon.

Another part of the imaginary surface can correspondingly be dedicated to be used as a writing surface. In a preferred embodiment, the position code with which said writing surface is provided therefore constitutes a second subset of an absolute position code which codes coordinates for points on an imaginary surface, the second subset coding coordinates within an area on the imaginary surface, said area being dedicated to electronic recording of information.

The operation corresponding to said at least one activation icon may comprise transfer of the recorded information to another unit. In this context, the user may have to indicate an address which defines where the information is to be sent. For instance, the address can be fetched from a register in the device, from a computer or from the writing surface.

In a preferred embodiment, however, the product has a character recognition area which is provided with the position code. Information which is written in this area will be subjected to character recognition. In the first place, it is intended for address information. A piece of address information can be an IP address, a fax number, a phone number, an e-mail address or some other information defining a receiver which can be reached via a machine. It can also be used to write keywords that are stored together with the information recorded from the writing surface, thus making this searchable later by means of the keywords, or to write a title in, for instance, an e-mail.

In a preferred embodiment, the position code with which said character recognition area is provided is a third subset of an absolute position code coding coordinates for points on an imaginary surface, the third subset coding coordinates within an area on the imaginary surface, which area is dedicated to information that is to be subjected to character recognition.

The writing surface, the activation icon and the character recognition area are thus coded by different subsets of the absolute position code. These subsets can be continuous with each other or discontinuous with each other.

As already mentioned, the product has at least one activation icon. In a preferred embodiment, however, the product has a plurality of activation icons for activating various predetermined operations. The user can thus choose between different operations which use the recorded information.

The position code, and the activation icon in case it is not detected by means of a position code, can be designed in various ways. For instance, they can be electrically, chemically or mechanically detectable. They need not be detectable using the same principle. In a preferred embodiment, however, both the icon and the position code are optically detectable. Thus, they will be more easy to apply to a product since they can be, for instance, printed thereon. Moreover a device with one or more optical sensors can be used for the detection of the icon and the position code. In this embodiment, the activation icons and the position code are passive. They need only have an effect on light so that the sensor receives light with different intensity on the one hand from the background and, on the other hand, from the activation icons and/or the position code. The effect can occur, for instance, by reflection, absorption, emission, fluorescence, or transmission. However, the light need not be in the visible range.

The activation icon can activate the device to initiate essentially any conceivable operation whatever which uses the recorded information. In fact the selection is only limited by the functions of the device which is to use the product. There can be a standard set of activation icons on the product. It is not necessary for all devices to be able to use all activation icons.

In an advantageous embodiment, the predetermined operation is an operation from the group: dialing a telephone number included in the recorded information, sending a fax containing the recorded information, sending an electronic message containing the recorded information, entering address information included in the recorded information in an electronic address book, entering calendar information included in the recorded information in an electronic calendar, entering a task included in the recorded information in an electronic list, printing the recorded information on a printer, and storing the recorded information at a predetermined location.

There can be different types of the position code. It can be of a type which codes each position with a unique symbol. The position code can, however, preferably be of a type which codes each position with a plurality of symbols, each symbol contributing to the coding of more than one position. Examples of how this type of overlapping or floating code can be implemented and detected are to be found in, inter alia, Applicant's previous Applications No. SE 9901954-9 which was filed on 28 May 1999 and SE 9903541-2 which was filed on 1 Oct. 1999. These applications are incorporated herewith by reference. An example of the position code according to the latter application will be given below. The advantage of the position code of this type is that it provides good resolution and is easy to detect since the individual symbols can be made uncomplicated.

In a preferred embodiment, the position code comprises a raster and a plurality of symbols, the value of each symbol being determined by the location of a marking in relation to said raster. This position code is particularly simple and reliable to detect and image process since it merely requires identification of a marking which can be identical for all the symbols.

The product can be any type of product having a writing surface and at least one activation icon. It may consist of two physically separate parts, the writing surface with the position code being located on one part and the activation code on the other. Alternatively, it may consist of a single part incorporating both the activation icon and the writing surface. The activation icon can then be positioned on the writing surface or on some other surface. The product can be, for example, a sheet of paper with a writing surface with a position code on one part of the paper and an activation icon on another part. In a preferred embodiment, the product is a notepad with a plurality of writing surfaces.

The different sheets of the notepad can be identical, in which case the position code thus codes the same positions on all the sheets. In an alternative embodiment, however, the position code codes different positions on the different sheets so that an identification of the sheets can be made on the basis of the positions coded by the position code.

Alternatively, the product can be a paper product consisting of at least one sheet comprising said writing surface, at least part of a surface of the sheet being coated with a preferably weakly adhesive layer.

Such a product can be used in the same way as the products sold under the trademark Post-It, but with the advantage that what is written on the product can simultaneously be recorded electronically.

Moreover, according to a second aspect, the invention relates to a device for information management, which is adapted to electronically record information which is being written on a writing surface. The device is further adapted to initiate a predetermined operation which uses the electronically recorded information when it detects a predetermined activation icon.

An advantage of this device is that is easy to use since the user need not learn different commands and need not press different buttons to open a desired program.

As mentioned above, the device will at least initiate, however possibly with a certain delay, the predetermined operation when the icon is detected. Depending on which functions are available in the device, it can in some cases carry out the entire operation. In other cases, the device can, for instance, automatically transfer the recorded information and information about which operation is to be carried out to an external unit, such as a PC or mobile telephone, which finishes the operation. This transfer can occur immediately or on a later occasion. By "initiate" is here meant that the device ensures that the operation is carried out even if it does not carry out the operation itself, so that the user need not give an additional command to the device or the external unit for the operation to be carried out. However, the user may need to supply additional information and/or confirm the operation/information. In its simplest embodiment, the device need not itself recognize or interpret the coordinates corresponding to the different activation icons, but it ensures that a desired operation will be carried out by passing on all coordinates to a unit which can interpret them.

The device need not be used together with the above product with a position code on the writing surface, but it can record the information that is being written on the writing surface in alternative manners. It may comprise, for example, an accelerometer which records the movement of the device when the device is used to write on a writing surface. It can alternatively comprise a scanner which scans the information. In a preferred embodiment, however, the device is, as has been stated above, adapted to record the information by detecting a position code that is located on the writing surface. This embodiment is advantageous since the information is recorded while being written on the surface. The user can thus have both a paper version and an electronic version of what has been written. The position code is recorded continuously as the information is being written, a sequence of position indications being obtained, which define how the device has been moved. The device is also advantageous since it enables the use of the same technique for recording of information and for detection of the activation icon.

As stated above, the activation icon can be designed in various ways, and therefore different types of sensors can be used in the device depending on the technique with which the activation icon is implemented. In a preferred embodiment, the device is, as stated above, adapted to detect the activation icon by means of a position code with which the activation icon is provided.

It is per se possible to implement the device with two sensors of the same or of a different type, but the device will be less expensive and easier to use if it is implemented with a single sensor for both recording of information and detection of the activation icon, preferably in the form of a position code.

The sensor is advantageously an optical sensor which is adapted to record images of the writing surface. The optical sensor is advantageous since it allows the recording of information and the initiation of the predetermined operation to be based on image processing which is a well-known and well-developed technique.

In a preferred embodiment, the device further comprises a signal processor which is adapted to detect, in a signal from said at least one sensor, the activation icon and the recorded information for initiation of the predetermined operation.

The signal processor can be implemented, for example, with a microprocessor with suitable associated circuits and software or as an ASIC (Application Specific Integrated Circuit), or as an FPGA (Field Programmable Gate Array) or similar programmable circuits. In the input signal which it receives, it need be able to identify what constitutes the activation icon and what constitutes the recorded information that the operation corresponding the activation icon is to use.

If the activation icon and the recorded information are detected with two different sensors, for example with an optical sensor and an accelerometer, respectively, this is easy since the signal processor then receives signals from two different sources.

As mentioned above, however, both the information and the activation icon are advantageously recorded by means of a position code. In a preferred embodiment, the signal processor is then adapted to receive the position code recorded by said at least one sensor, to determine which position the recorded position code codes, to determine, on the basis thereof, whether the position code relates to the writing surface, in which case the position is processed as representing information that has been written on the writing surface, or to the activation icon, in which case the predetermined operation corresponding to the position is initiated.

Although the signal processor receives the same type of signal from the sensor, it can thus identify that represented by the position code and take suitable measures. To be able to carry out the identification, the signal processor must know which positions represent the writing surface and which represent the activation icon. The positions which identify the respective areas can be stored in a memory in the device or at some other location where they are available for the device, for instance at a predetermined location in a computer network to which the position code is sent.

The signal processor can advantageously comprise a character recognition function for converting the recorded information to a character-coded format. The advantage of this is that the device can interpret the information and process it in an intelligent manner on the basis of the contents. As long as the information is merely represented as positions, it can, however, only be processed as graphical information.

The character recognition function can be used to interpret information that is written in a specific character recognition area or is written in an arbitrary position on the writing surface, but which the user then marks for character recognition, e.g. by underlining the information. In the former case, only the information in the specific area will be interpreted whereas all other written information is processed as graphical information.

In a preferred embodiment, the device further comprises a memory for storage of the recorded information. This means that the device can be used in a stand-alone mode quite independently of other units. The user can record information and indicate which operation is to be carried out, whereupon the device carries out the operation when there is a possibility, for example when it gets into contact with an external unit, and then fetches recorded information from the memory. The device thus need not initiate the operation immediately as the activation icon is detected.

It is desirable that it should be possible to carry out a plurality of different operations for different notes that are written on different occasions on different parts of one and the same writing surface. This means that the device must know which part of the recorded information is to be used when a predetermined operation is to be executed.

In order to solve this problem, the device is in one embodiment adapted to use, when initiating the predetermined operation, that part of the information which has been recorded from the writing surface during a predetermined period. The period can be an absolute period or a relative period, for instance the period after the immediately preceding detection of an activation icon. In practical terms, this can be solved by the memory where the recorded information is stored being erased after each initiated operation. Alternatively, the period can be after the detection of the activation icon so that all information that is recorded during a predetermined period after the detection of the activation icon is used in the operation initiated via the activation icon.

As an alternative, the device can be adapted to use, when carrying out the predetermined operation, information that has been recorded in an area on the writing surface. The area can be predetermined so that information recorded from this area always is used when carrying out the operation. Alternatively, the user himself can each time define the area in question, for example by reading the coordinates from the corners of a rectangular area within which the information is to be used. It goes without saying that this alternative can also be combined with a time limit. An advantage of sending information from a certain area is that information can be sent a plurality of times and that previously recorded information can be supplemented.

For the device not to be too complicated and thus expensive to manufacture, the device can advantageously use functions of external units for initiation and execution of certain operations. To this end, the device comprises in a preferred embodiment a transceiver for wireless short-range communication. The transceiver is advantageously a radio transceiver utilizing the so-called Bluetooth technology. It can alternatively be some other transceiver which can communicate wirelessly at a distance of less than about 100 m, e.g. an IR transceiver, an ultrasonic transceiver, a transceiver using ordinary light or a radio transceiver operating according to the Air-port technology.

The entire device can advantageously be arranged in one casing, but in an alternative embodiment it is m also conceivable that the sensor or sensors, i.e. the part used by the user to record the information and the activation icon, can be located in a first casing while the signal processor, i.e. the part initiating the predetermined operation on the basis of the detected activation icon, can be located in a second casing.

The communication between the first and the second casing can take place wirelessly or via cable. The second casing can be e.g. a personal computer, the signal processor being software which is installed in the personal computer. It is also conceivable that some processing of e.g. the recorded position code occurs in the first casing before the transfer to the second casing occurs.

In a more advanced and, thus, technically more complicated and more expensive design, the device comprises a mobile telephone transceiver for transferring the recorded information from the device to an external unit, the predetermined operation being an operation from the group dialing a telephone number included in the recorded information, sending a fax containing the recorded information, sending an electronic message containing the recorded information, printing the recorded information by means of a printer, and storing the recorded information in the external unit.

According to a third aspect of the present invention, it relates to a computer program for information management, which is stored on a memory medium which can be read by a computer and which comprises instructions to cause the computer to detect an activation icon in an image and, in response to the detection of the activation icon, initiate a predetermined operation. The advantages of this program are evident from the discussions above. The computer can be the processor that is included in the device described above.

According to a fourth aspect of the present invention, it relates to a system for information management, comprising a device which is adapted to record information electronically, and a product which is provided with at least one activation icon which indicates a predetermined operation, the device being adapted to initiate the predetermined operation for the recorded information in response to the detection of the activation icon.

The advantages of the system are evident from the discussion above.

According to a fifth aspect of the invention, it relates to a method of managing information, comprising the steps of writing information on a writing surface with a device; recording the written information electronically with the device; and causing the device to initiate a predetermined operation for the recorded information by letting the device detect an activation icon before or after the recording of the written information.

This method makes it possible for the user to manage information in a very simple manner. She can write down the information as usual with a device comprising a pen on a sheet of paper, but still directly initiate one or more operations which normally require starting of a special computer program and subsequent input of the information into a computer, merely by letting the device detect an activation icon. It is not necessary according to the invention that the information be written before the activation icon is detected. It is also conceivable to let the device detect the activation icon before the note is made. The writing step and the recording step can, as stated above, advantageously be carried out simultaneously.

The technique described above could also be used for general control of handheld computers and other handheld electronic devices, such as mobile telephones, PDAs, reading pens and handheld scanners. Such devices are normally controlled by the user, by means of one or more buttons, making a selection on menus or among icons that are shown on the display of the computer. These devices could be controlled more easily by using activation icons which activate different predetermined operations which are normally executed by the pressing of buttons.

To that end, the invention relates, according to one more aspect, to a handheld electronic device which is adapted to carry out predetermined operations at the command of a user. This device has a sensor for detecting at least one activation icon, and a signal processor which is adapted to carry out, in response to the sensor's detection of the activation icon, one of said predetermined operations.

The device can especially be a reading pen sold under the trademark C-PEN. Such a reading pen is described in, for instance, SE 9604008-4. This device is controlled by means of buttons and menus shown on a display. The control could be simplified by using activation icons.

The activation icon or icons can be positioned, for instance, on a product of the type mouse pad, on a sheet of paper or on some other product which is easily available to the user. The predetermined operation can be any operation whatever which a user normally commands a handheld electronic device to execute by means of a mouse, buttons or keys of a keyboard. Examples of such operations are starting or closing a program, and saving or deleting information that has been recorded.

What has been said above about the device for information management and the product with activation icons is, of course, applicable in appropriate parts also as regards control of a handheld electronic device.

BRIEF DESCRIPTION OF THE DRAWINGS

The present invention will now be described in more detail by way of embodiments with reference to the accompanying drawings in which.

DETAILED DESCRIPTION OF A PREFERRED EMBODIMENT

Below follows a description of the currently most preferred embodiment of the invention in the form of a notepad sheet and a device for use together with the notepad sheet. Subsequently, alternative embodiments will be described.

The Product

Writing Surface

Figure 1:
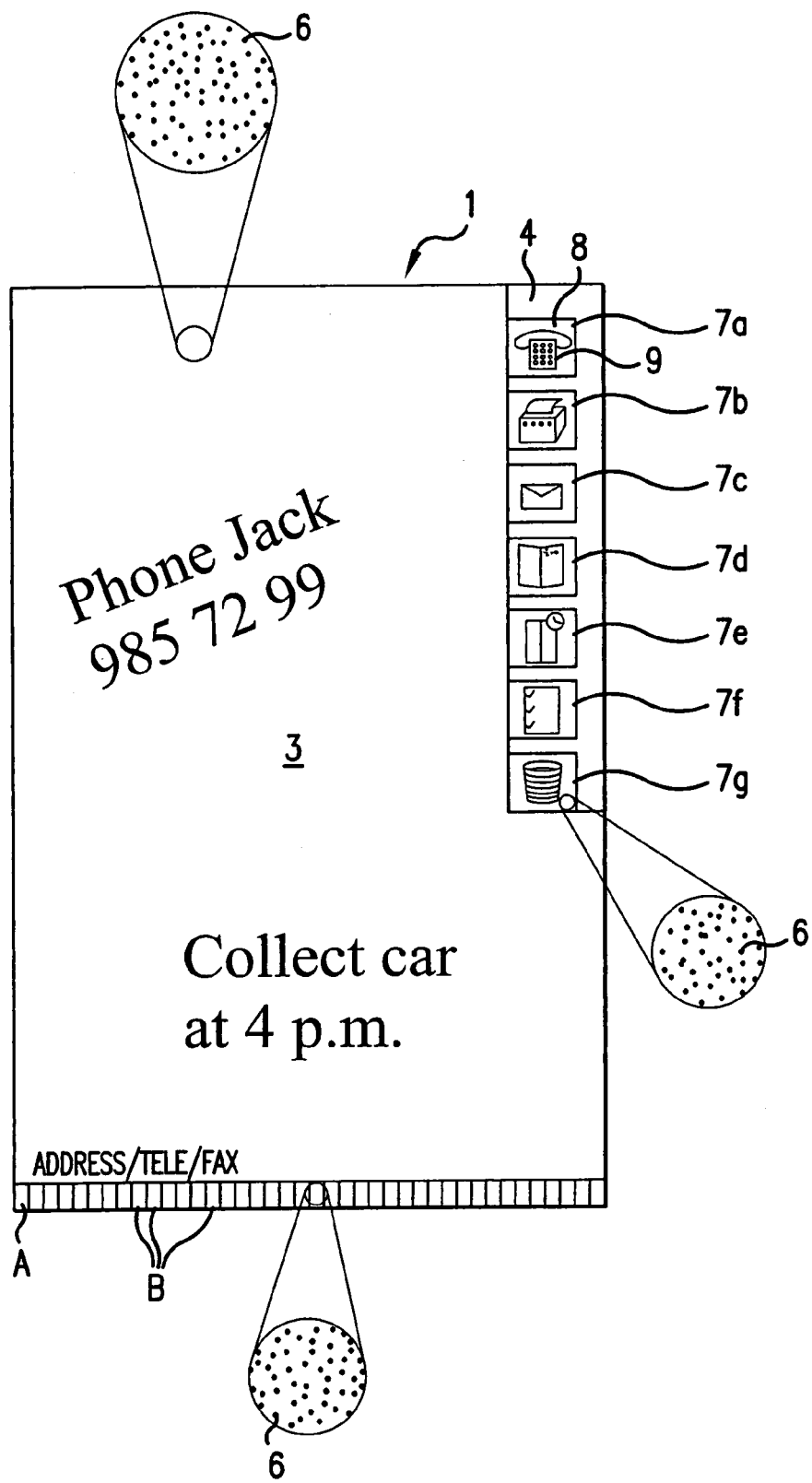
FIG. 1 is a schematic view of an embodiment of a product according to the invention in the form of a note-pad sheet.

FIG. 1 shows a product in the form of a notepad sheet 1 of paper. The sheet 1 has a writing surface 3, a command field 4 and an address area A.

On the writing surface 3 there is printed a position code 5 which is composed of symbols. Each symbol comprises a marking in the form of a dot 6. The location of the dot 6 in relation to an imaginary raster extending over the writing surface determines the value of the symbol. For the sake of clarity, the position code is shown schematically on only a small part of the writing surface, and this part of the position code has been enlarged.

The position code 5 will be described in more detail below under the title Position Code.

The position code on the writing surface 3 makes it possible to electronically record graphical information, such as handwritten text and numbers and hand-drawn figures, while being produced on the writing surface 3. More specifically, the position of a pen point which produces the graphical information is recorded continuously by reading the position code locally at the pen point. In this manner, a digital representation of the movement of the pen point over the writing surface is provided.

Activation Icons

In the command field 4, there are printed seven different activation icons 7*a*–*g* which can be used to command a device to initiate and/or execute different operations. The icons 7a–g comprise on the one hand an activation area 8 which is the area within which a user can position a device to record the icon and in this manner initiate the predetermined operation and, on the other hand, a visual indication 9 of the function of the icon which is graphically designed in such manner that the user understands which operation is activated by the icon. The visual indications 9 are in this example images, but they may also comprise text and/or numbers and/or other symbols. They are placed in the activation areas 8, but they can also be placed outside, but in connection with these, if they are not used to detect the icon.

In the shown embodiment, the activation icons are provided with the same position code as the writing surface, but the position code codes one or more positions other than those coded by the position code on the writing surface. The position code is schematically shown on only a small part of one of the activation icons and this part has been enlarged.

Each icon corresponds to a predetermined operation which is to be initiated when the icon is "activated", i.e. detected by an appropriate device. The icons in this embodiment are examples only. A person skilled in the art can design a large number of other icons with associated predetermined operations.

1.3 Character Recognition Area

At the bottom of the sheet there is a character recognition area A. This is in the first place intended for address information which is required in connection with different operations which are initiated by the activation icons and which need be subjected to character recognition, but it can also be used for keywords and other text that need be subjected to character recognition. The character recognition area A is visually separated from the writing surface so that its extent is clear to the user. In this embodiment, the area is also divided into sections B which each are intended to receive one character. The character recognition area is provided with the same position code as the writing surface and the activation icons, but the position code in the address area codes other positions than the position code on the writing surface and the activation icons. The position code is shown schematically on only a small part of the area A. This part has been enlarged.

1.3 Position Code—in General Terms

The position code can be of different types. A possible type of position code where each position is coded with a unique symbol is disclosed in U.S. Pat. No. 5,852,434 mentioned by way of introduction.

In the preferred embodiment of the present invention, each position is, however, advantageously coded by means of a plurality of symbols, and the coding is such that each symbol in the position code contributes to the coding of more than one position. This means that two neighboring positions have partly common symbols. In this manner, a higher resolution is achieved and the detection will be easier since the individual symbols can be less complex. This type of overlapping or floating position code can be provided by means of a computer. A special way of generating such a floating position code is described in Applicant's previous Swedish Patent Application No. 9901954-9 that was filed on 28 May 1999 and is incorporated herein by reference.

Now follows a description of an alternative type of floating position code which is the presently most preferred position code. This position code is the subject matter of Applicant's Swedish Patent Application No. 9903541-2 that was filed on 1 Oct. 1999. It is below referred to as a position-coding pattern since a surface to which the position code is applied gives a slightly patterned impression.

Figure 2:
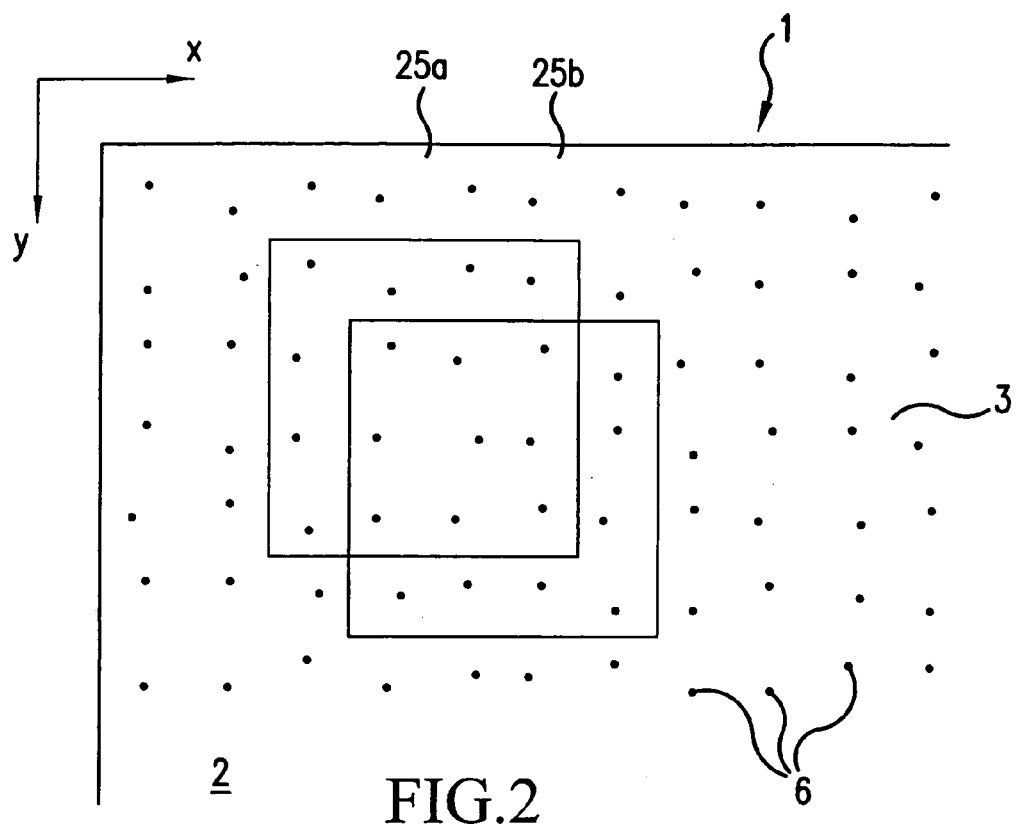
FIG. 2 is a schematic view of an enlarged part of the sheet in FIG. 1.

FIG. 2 shows an enlarged part of the sheet in FIG. 1 which on its surface 2 is provided with the position-coding pattern 5. The sheet has an x coordinate axis and a y coordinate axis.

The position-coding pattern comprises a virtual raster which neither is visible to the human eye nor can be detected directly by a device which is to determine positions on the surface, and a plurality of symbols which each can assume one of four values "1"–"4" as will be described below.

The position-coding pattern is arranged in such a manner that the symbols on a partial surface of the sheet of paper code absolute coordinates of a point on an imaginary surface, which will be described below. A first and a second partial surface 25a, 25b are indicated by dashed lines in FIG. 2. That part of the position-coding pattern (in this case 4×4 symbols) which is to be found on the first partial surface 25a codes the coordinates of a first point, and that part of the position-coding pattern which is to be found on the second partial surface 25b codes the coordinates of a second point on the imaginary surface. Thus the position-coding pattern is partially shared by the adjoining first and second points. Such a position-coding pattern is in this application referred to as "floating".

Figure 3:
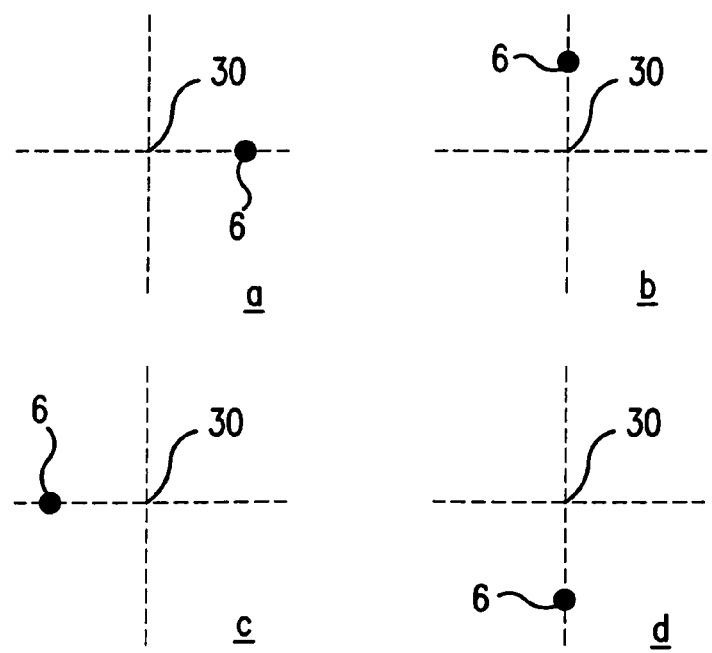
FIG. 3 shows schematically how symbols included in the position-coding pattern can be composed.

FIGS. 3a–3b show an embodiment of a symbol which can be used in the position-coding pattern. The symbol comprises a virtual raster point 30 which is represented by the intersection between the raster lines, and a marking 6 which has the form of a dot. The value of the symbol depends on where the marking is located. In the Example in FIG. 3, there are four possible locations, one on each of the raster lines extending from the raster points. The displacement from the raster point is equal to all values. In the following, the symbol in FIG. 3a has the value 1, in FIG. 3b the value 2, in FIG. 3c the value 3 and in FIG. 3d the value 4. Expressed in other words, there are four different types of symbols.

It should be pointed out that the dots can, of course, have a different shape.

Each symbol can thus represent four values "1–4". This means that the position-coding pattern can be divided into a first position code for the x coordinate, and a second position code for the y coordinate. The division is effected as follows:

| Symbol value | x-code | y-code |
| --- | --- | --- |
| 1 | 1 | 1 |
| 2 | 0 | 1 |
| 3 | 1 | 0 |
| 4 | 0 | 0 |

Thus, the value of each symbol is translated into a first digit, in this case bit, for the x-code and a second digit, in this case bit, for the y-code. In this manner, two completely independent bit patterns are obtained. The patterns can be combined to a joint pattern, which is coded graphically by means of a plurality of symbols according to FIG. 3.

The coordinates for each point is coded by means of a plurality of symbols. In this example, use is made of 4×4 symbols to code a position in two dimensions, i.e. an x-coordinate and a y-coordinate.

The position code is made up by means of a number series of ones and zeros which have the characteristic that no sequence of four bits appears more than once in the series. The number series is cyclic, which means that the characteristic also applies when one connects the end of the series to the beginning of the series. Thus a four-bit sequence always has an unambiguously determined position in the number series.

The series can maximally be 16 bits long if it is to have the above-described characteristic for sequences of four bits. In this example, use is, however, made of a series having a length of seven bits only as follows:

"0 0 0 1 0 1 0".

This series contains seven unique sequences of four bits which code a position in the series as follows:

| Position in the series | Sequence |
|---|---|
| 0 | 0001 |
| 1 | 0010 |
| 2 | 0101 |
| 3 | 1010 |
| 4 | 0100 |
| 5 | 1000 |
| 6 | 0000 |

For coding the x-coordinate, the number series is written sequentially in columns across the entire surface that is to be coded. The coding is based on the difference or position displacement between numbers in adjoining columns. The size of the difference is determined by the position (i.e. with which sequence) in the number series, in which one lets the column begin. More specifically, if one takes the difference modulo seven between on the one hand a number which is coded by a four-bit sequence in a first column and which thus can have the value (position) 0–6, and, on the other hand, the corresponding number (i.e. the sequence on the same "level") in an adjoining column, the result will be the same independently of where along the two columns one makes the comparison. By means of the difference between two columns, it is thus possible to code an x-coordinate which is constant for all y-coordinates.

Since each position on the surface is coded with 4×4 symbols in this example, three differences (having the value 0–6) as stated above are available to code the x-coordinate. Then the coding is carried out in such manner that of the three differences, one will always have the value 1 or 2 and the other two will have values in the range 3–6. Consequently no differences are allowed to be zero in the x-code. In other words, the x-code is structured so that the differences will be as follows: (3-6) (3-6) (1-2) (3-6) (3-6) (1-2) (3-6) (3-6) (1-2) . . . Each x-coordinate thus is coded with two numbers between 3 and 6 and a subsequent number which is 1 or 2. If three is subtracted from the high numbers and one from the low, a number in mixed base will be obtained, which directly yields a position in the x-direction, from which the x-coordinate can then be determined directly, as shown in the example below.

By means of the above described principle, it is thus possible to code x-coordinates 0,1,2 . . . , with the aid of numbers representing three differences. These differences are coded with a bit pattern which is based on the number series above. The bit pattern can finally be coded graphically by means of the symbols in FIG. 3.

In many cases, when reading 4×4 symbols, it will not be possible to produce a complete number which codes the x-coordinate, but parts of two numbers. Since the least significant part of the numbers is always 1 or 2, a complete number, however, can easily be reconstructed.

The y-coordinates are coded according to the same principle as used for the x-coordinates. The cyclic number series is repeatedly written in horizontal rows across the surface which is to be position-coded. Just like in the case of the x-coordinates, the rows are allowed to begin in different positions, i.e. with different ferent sequences, in the number series. However, for y-coordinates one does not use differences but codes the coordinates with numbers that are based on the starting position of the number series on each row. When the x-coordinate for 4×4 symbols has been determined, it is in fact possible to determine the starting positions in the number series for the rows that are included in the y-code in the 4×4 symbols. In the y-code the most significant digit is determined by letting this be the only one that has a value in a specific range. In this example, one lets one row of four begin in the position 0-1 in the number series to indicate that this row relates to the least significant digit in a y-coordinate, and the other three begin in the position 2-6. In y-direction, there is thus a series of numbers as follows: (2-6) (2-6) (2-6) (0-1) (2-6) (2-6) (2-6) (0-1) (2-6) . . . Each y-coordinate thus is coded with three numbers between 2 and 6 and a subsequent number between 0 and 1.

If 0 is subtracted from the low number and 2 from the high, one obtains in the same manner as for the x-direction a position in the y-direction in mixed base from which it is possible to directly determine the y-coordinate.

With the above method it is possible to code 4×4×2=32 positions in x-direction. Each such position corresponds to three differences, which gives 3×32=96 positions. Moreover, it is possible to code 5×5×5×2=250 positions in y-direction. Each such position corresponds to 4 rows, which gives 4×250=1000 positions. Altogether it is thus possible to code 96000 positions. Since the x-coding is based on differences, it is, however, possible to select in which position the first number series begins. If one takes into consideration that this first number series can begin in seven different positions, it is possible to code 7×96000=672000 positions. The starting position of the first number series in the first column can be calculated when the x-coordinate has been determined. The above-mentioned seven different starting positions for the first series may code different sheets of paper or writing surfaces on a product.

With a view to further illustrating the function of the position-coding pattern, here follows a specific example which is based on the described embodiment of the position code.

Figure 4:
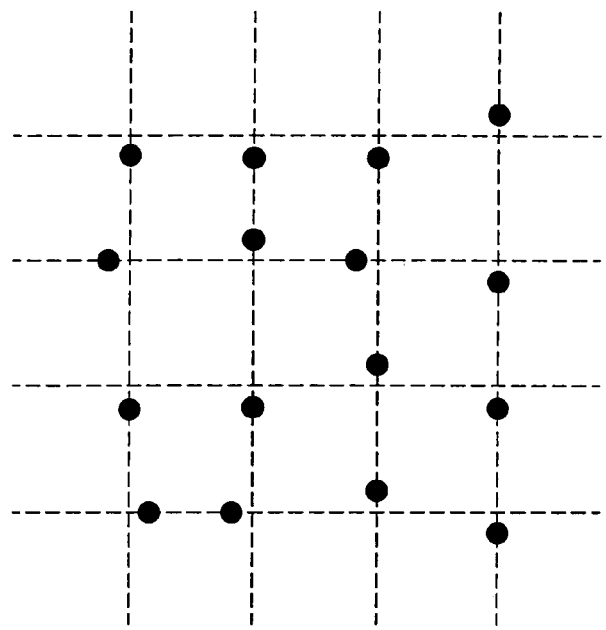
FIG. 4 is a schematic view of an example of 4×4 symbols that are used to code a position.

FIG. 4 shows an example of an image with 4×4 symbols which are read by a device for position determination.

These 4×4 symbols have the following values:

4 4 4 2
3 2 3 4
4 4 2 4
1 3 2 4

These values represent the following binary x- and y-code:

| x-code: | y-code: |
|---|---|
| 0 0 0 0 | 0 0 0 1 |
| 1 0 1 0 | 0 1 0 0 |
| 0 0 0 0 | 0 0 1 0 |
| 1 1 0 0 | 1 0 1 0 |

The vertical x-sequences code the following positions in the number series: 2 0 4 6. The differences between the columns will be −2 4 2, which modulo 7 gives: 5 4 2, which in mixed base codes position (5-3)×8+(4-3)×2+(2-1)=16+2+1=19. Since the first coded x-position is position 0, the difference which is in the range 1-2 and which is to be seen in the 4×4 symbols is the twentieth such difference. Since furthermore there are a total of three columns for each such difference and there is a starting column, the vertical sequence furthest to the right in the 4×4 x-code belongs to the 61st column in the x-code (3×20+1=61) and the one furthest to the left belongs to the 58th.

The horizontal y-sequences code the positions 0 4 1 3 in the number series. Since these series begin in the 58th column, the starting position of the rows are these numbers minus 57 modulo 7, which yields the starting positions 6 3 0 2. Translated into digits in the mixed base, this will be 6-2, 3-2, 0-0, 2-2=4 1 0 0 where the third digit is the least significant digit in the number at issue. The fourth digit is then the most significant digit in the next number. In this case, it must be the same as in the number at issue. (An exceptional case is when the number at issue consists of the highest possible digits in all positions. Then one knows that the beginning of the next number is one greater than the beginning of the number at issue.)

The position of the four-digit number will then in the mixed base be 0×50+4×10+1×2+0×1=42.

The third row in the y-code thus is the 43rd which has the starting position 0 or 1, and since there are four rows in all on each such row, the third row is number 43×4=172.

Thus, in this example, the position of the uppermost left corner for the 4×4 symbol group is (58,170).

Since the x-sequences in the 4×4 group begin on row 170, the x-columns of the entire pattern begin in the positions of the number series ((2 0 4 6)-169) modulo 7=1 6 3 5. Between the last starting position (5) and the first starting position, the numbers 0-19 are coded in the mixed base, and by adding up the representations of the numbers 0-19 in the mixed base, one obtains the total difference between these columns. A naive algorithm to do so is to generate these twenty numbers and directly add up their digits. The resulting sum is called s. The sheet of paper or writing surface will then be given by (5-s)modulo7.

In the example above, an embodiment has been described, in which each position is coded with 4×4 symbols and a number series with 7 bits is used. Of course, this is but an example. Positions can be coded with a larger or smaller number of symbols. The number of symbols need not be the same in both directions. The number series can be of different length and need not be binary, but may be based on another base. Different number series can be used for coding in x-direction and coding in y-direction. The symbols can have different numbers of values. As is evident from the above, a coding with 6×6 symbols is presently preferred, each symbol being capable of assuming four values. A person skilled in the art can readily generalize the above examples to concern such coding.

In the example above, the marking is a dot but may, of course, have a different appearance. For example, it may consist of a dash or some other indication which begins in the virtual raster point and extends therefrom to a predetermined position. As one more alternative, the marking may consist of a rectangle, a square, a triangle or some other convenient, easily detected figure. The marking can be filled or open.

In the example above, the symbols within a square partial surface are used for coding a position. The partial surface may have a different form, such as hexagonal. The symbols need not be arranged in rows and columns at an angle of 90° to each other but can also be arranged at other angles, e.g. 600, and/or in other arrangements. They could also code positions in polar coordinates or coordinates in other coordinate systems.

For the position code to be detected, the virtual raster must be determined. This can be carried out by studying the distance between different markings. The shortest distance between two markings must derive from two neighboring symbols having the value 1 and 3 (horizontally) or 2 and 4 (vertically) so that the markings are located on the same raster line between two raster points. When such a pair of markings has been detected, the associated raster points can be determined with knowledge of the distance between the raster points and the displacement of the markings from the raster points. When two raster points have once been located, additional raster points can be determined by means of measured distances to other markings and with knowledge of the relative distance of the raster points.

The position-coding pattern described above can code a large number of unique positions and more specifically the absolute coordinates of these positions. All the positions or points that can be coded by means of the position-coding pattern can be said to jointly make up an imaginary surface. Different parts of the imaginary surface can be dedicated to different specific purposes. One area of the imaginary surface can, for instance, be dedicated to be used as a writing surface, another as a character recognition area and yet other areas as various activation icons. Other areas of the imaginary surface can be used in other applications. A corresponding subset of the position-coding pattern can then be used to create, for example, a certain activation icon which can be arranged in an optional location on a product. The coordinates coded by this subset of the position-coding pattern thus do not relate to a position on the product but to a position on the imaginary surface, which position is dedicated always to correspond to this activation icon.

In the presently preferred embodiment, the nominal interspace between the dots is 0.3 mm. Any part whatever of the position-coding pattern which contains 6×6 dots defines the absolute coordinates of a point on the imaginary surface. Each point on the imaginary surface is thus defined by a 1.8 mm×1.8 mm subset of the position-coding pattern. By determining the position of the 6×6 dots on a sensor in a device which is used to read the pattern, a position can be calculated by interpolation on the imaginary surface with a resolution of 0.03 mm. Since each point is coded with 6×6 dots which can each assume one of four values, 272 points can be coded, which with the above-mentioned nominal interspace between the dots corresponds to a surface of 4.6 million km$^2$.

The absolute position-coding pattern can be printed on any paper whatever or other material which enables a resolution of about 600 dpi. The paper can have any size and shape whatever depending on the intended application. The pattern can be printed by standard offset printing. Ordinary black carbon-based ink or some other ink which absorbs IR light can advantageously be used. This means in fact that other inks, including black ink which is not carbon-based, can be used to superimpose other printed text on the absolute position-coding pattern, without interfering with the reading thereof.

A surface which is provided with the above-mentioned pattern printed with carbon-based black ink will be experienced by the human eye as only a slight gray shading of the surface (1–3% density), which is user-friendly and aesthetically pleasing.

Of course, a smaller or large number of dots than described above can be used to define a point on the imaginary surface and a larger or smaller distance between the dots can be used in the pattern. The examples above are only given to demonstrate a presently preferred implementation of the pattern.

Position Code on the Product

Figure 5A:
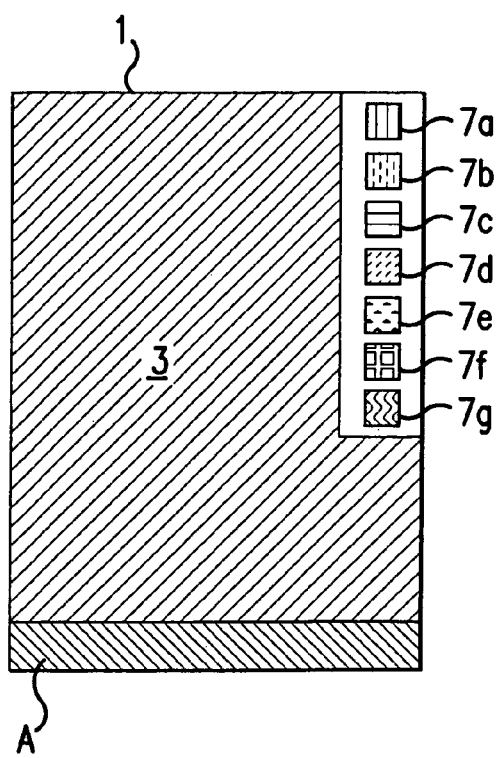
FIG. 5 shows schematically how the position-coding pattern is arranged on the notepad sheet according to FIG. 1 and on the imaginary surface, respectively.
Figure 5B:
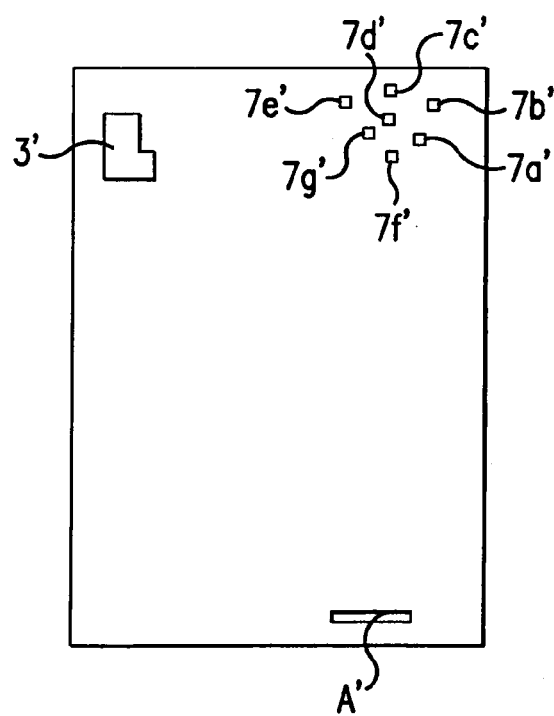

FIG. 5a shows the sheet 1 in FIG. 1 once more, the different subsets of the position-coding pattern being marked with different kinds of hatching. The sheet comprises nine different areas which correspond to the writing surface 3, the address area A and the seven activation icons 7a–g. Each of these areas is provided with a separate subset of the position-coding pattern. FIG. 5b shows corresponding coordinate areas on the imaginary surface I, the areas being given the same reference numerals with the sign added. The imaginary surface consists of the coordinate area (0,0; $x_n$, 0; $x_n$:$y_m$; 0,$y_m$). It is evident that the position code is not continuous over the entire product but that the different subsets are fetched from different parts of the imaginary surface. The different coordinate areas on the imaginary surface are dedicated to the respective purposes. This means that a completely new layout of the sheet can be created without requiring any modifications in the device which is to record information from the writing surface 3, interpret address information from the address area A and detect the various activation icons 7a–g and initiate the corresponding operations.

An activation icon can be provided by means of the coordinates for a single point on the imaginary surface. In order to simplify detectability, a corresponding subset of the position-coding pattern can be repeated several times over the activation area of the activation icon. The repetition of the subset, however, must occur with a certain blank so that the subset which codes the coordinates for the point can be detected unambiguously.

Alternatively, the entire sheet 1 could be provided with a position-coding pattern which codes coordinates for a continuous coordinate area on the imaginary surface. In this case, each activation icon consists of a predetermined subset of the position-coding pattern which is coherent with the subset of the position-coding pattern which is located on the writing surface. The activation icon is detected when the pen has first been raised from the writing surface and then the coordinates of one or more points which are dedicated to the activation icon are recorded. The requirement that the pen be raised before the detection of the activation icon has the advantage that it is possible to distinguish between the user unintentionally writing over the activation icon and the user intentionally placing the pen on the activation icon to initiate the predetermined operation.

As mentioned above, the product can be provided with a plurality of activation icons to initiate different operations. In an alternative embodiment, the product has only one activation icon which defines that an operation is to be carried out. The user then defines himself which operation is to be initiated by writing in the activation area of the activation icon a symbol, a character, a word or some other predetermined indication which indicates which operation is to be initiated. The contents of the activation icon can be interpreted either in the device which detects the icon or in an external unit to which the information recorded from the writing surface and the activation area is transmitted.

The activation icons are in the first place used to initiate an operation. They could also be used to qualify the recorded information, e.g. characteristics thereof, such as color of the pen, line thickness and the like.

The Device

Figure 6:
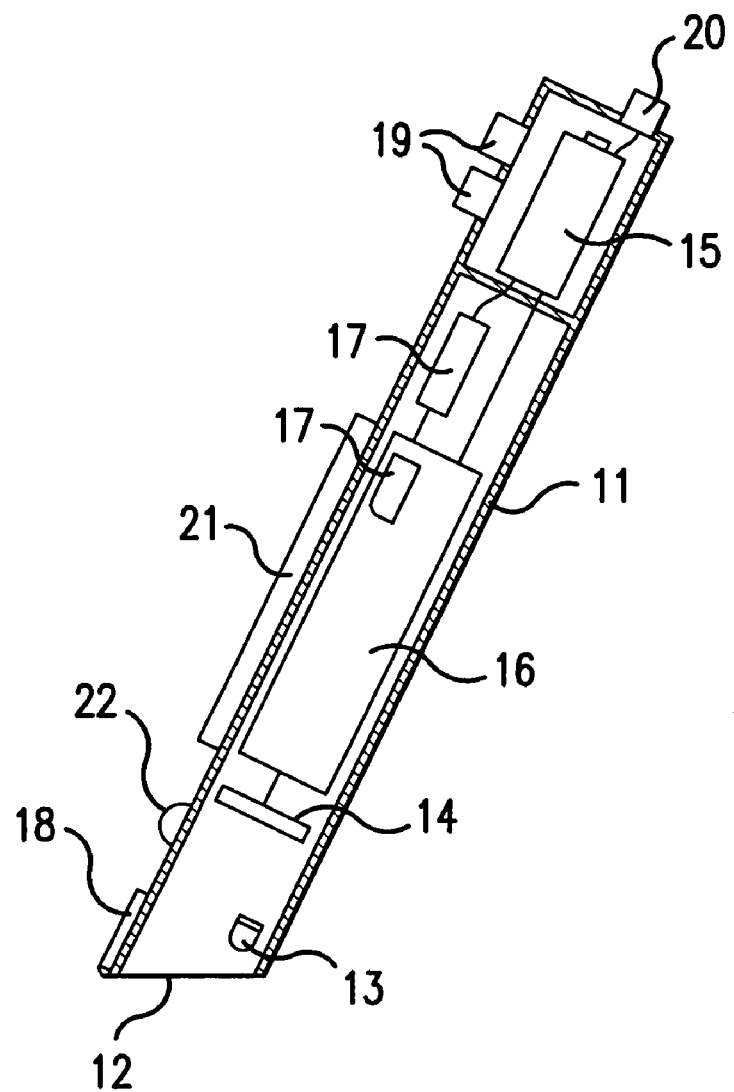
FIG. 6 is a schematic view of an embodiment of a device according to the invention.

FIG. 6 shows a device which can be used to electronically record graphical information which is produced on the writing surface and to initiate and/or carry out operations which are triggered by the detection of the activation icons.

The device comprises a casing 11 having approximately the shape of a pen. In one short side of the casing there is an opening 12. The short side is intended to abut against or be placed a small distance from the writing surface 3, the address area A and the activation icons 7a–7g.

The casing contains essentially an optics part, and electronic circuitry part and a power supply. The optics part comprises at least one IR light-emitting diode 13 for illuminating the surface which is to imaged and a light-sensitive area sensor 14, such as a CCD or CMOS sensor, for recording a two-dimensional image. The device may also comprise a lens system (not shown).

The power supply to the device is obtained from a battery 15 which is mounted in a separate compartment in the casing.

The electronic circuitry part comprises a signal processor 16. The signal processor 16 is accomplished by means of a suitably programmed microprocessor. It contains software to analyze images from the sensor to produce a digital representation of the graphical information which is provided on the writing surface and to detect the activation icons. It also comprises software to initiate and/or carry out the operations determined by the activation icons. It may also comprise user software, such as address book program to allow the user to keep track of address information, calendar program to allow the user to keep track of calendar information, such as meetings, birthdays, and other information entered in a calendar or diary, as well as to-do-list program so that the user can enter tasks which she is to carry out.

Advantageously, the signal processor 16 also comprises ICR software which can be used for interpreting recorded characters so that they can be stored, managed and/or transferred in character-coded format.

The signal processor also comprises a memory 17 for storing information which is recorded from the writing surface 3 and the address area A.

On the casing of the device there is also a pen point 18, with the aid of which it is possible to write ordinary pigment-based writing on the writing surface. The pen point 18 is extendable and retractable so that the user can control whether or not it is to be used. The pen point is displaced in relation to the sensor 14. The sensor thus does not detect the exact position of the pen point. If desired, this may, however, be calculated, knowing the position of the pen point in relation to the sensor.

Moreover, the device comprises buttons 19 by means of which the device can be activated and controlled for operations which are not controlled by the activation icons.

The device also comprises a transceiver 20 for wireless communication, via short-range radio link according to the Bluetooth technology, of information over short distances. This wireless transmission can be used when the device cannot itself carry out the entire initiated operation but needs to forward the recorded information and information about which operation is to be carried out to an external unit.

Finally, the device may also comprise a display 21 for showing, for instance, recorded information. The display is not necessary. Showing can, if at all necessary, be carried out on a display of an external unit.

Applicant's Swedish Patent No. 9604008-4 describes a device for recording text. If programmed in a suitable way, this device can be utilized to record information which is being written in a writing surface provided with a position code, to detect activation icons, and to initiate/carry out operations activated by the activation icon.

In an alternative embodiment, the electronic circuitry part may comprise or be integrated with a mobile telephone unit which comprises a mobile telephone transceiver, which makes it possible to telephone, send faxes, and send e-mail messages to an external unit in the form of a telephone, a fax machine or a computer.

Furthermore, the device may have an indicating means 22, such as a light-emitting diode or a buzzer or a vibrator which indicates when the device detects the position code, so that the user knows that the written information is actually recorded electronically.

The Function

The function of the notepad sheet in FIG. 1 and the device in FIG. 6 will be described below.

A user uses the device in FIG. 6 to write or draw information on the writing surface 3. While the user writes, the optical sensor 14 continuously captures images of the writing surface 3 in the current position of the pen. The images contain the position code 5. The signal processor 16 locates the position code, i.e. the dots 6, in each image and determines on the basis thereof the coordinates for the position coded by the position code. In the signal processor, it is programmed how position information from different coordinate areas is to be processed. The signal processor can thus identify position indications from the coordinate area corresponding to the writing surface 3 as representing recorded information from the writing surface 3. This results in a description, in the form of a large number of position indications, of how the pen is moved over the sheet. This description constitutes a digital representation of the written information.

It should be pointed out that it is not necessary for the device to leave any trace on the writing surface since the electronic recording is based on imaging of the position code, not on what is actually written on the writing surface.

The digital representation of what has been written on the writing surface is stored in the memory 17.

If the user now wants to carry out a certain operation as regards the recorded information, she initiates the information by placing the device on the corresponding activation icon 7. The user can possibly make a marking, for instance put a mark over the icon for the device to detect a plurality of positions corresponding to the activation icon. In principle, however, it is sufficient for a single position in the activation area 8 to be recorded. The signal processor 16 processes images recorded from the activation area 8 of the activation icon in the same way as the images of the writing surface. It identifies the position code, decodes the coordinate, determines to which coordinate area the coordinates belong and, accordingly, how the coordinates, i.e. the position indication, are to be processed. When the signal processor detects that the position indication originates from an activation icon, it initiates the corresponding operation. The signal processor may suitably give the user some kind of feedback, such as a sound signal, which indicates to the user that the activation icon has actually been detected.

If the operation requires address information, the user writes this in the character recognition area A. Images which are then recorded by the optical sensor 14 are processed by the signal processor in the same way as described above. When the signal processor identifies that information is involved, which is to be subjected to character recognition, the information is, however, input to the character recognition program to be converted to character-coded format so that the signal processor can interpret the contents of the information.

Alternatively, the character recognition can be carried out in an external unit to which the recorded information is sent in graphical format.

When the signal processor has identified which operation is to be carried out, it collects the recorded information which is to be used in the operation from the memory 17. It may, for instance, fetch all information stored in the memory, or a subset thereof, for instance all information that has been stored during a predetermined period before the activation of the activation icon, or all information from a certain coordinate area, for instance the coordinate area corresponding to the writing surface 3 on the sheet.

Certain operations can be carried out in their entirety by the device itself, such as storage of a note in the pen, or entering a piece of information in a user program in the device. These operations can always be carried out by the device in stand-alone mode.

Other operations may require communication with the outside world. These operations can be begun in stand-alone mode but cannot be completed until the device is connected to the outside world. The signal processor 16 can then communicate directly with a neighboring external unit via the Bluetooth transceiver 20, such as a fax machine, a printer or the like, which is also provided with a Bluetooth transceiver, to make this carry out the desired operation while using the recorded information from the writing surface 3 and the address information from the character recognition area A.

Figure 7:
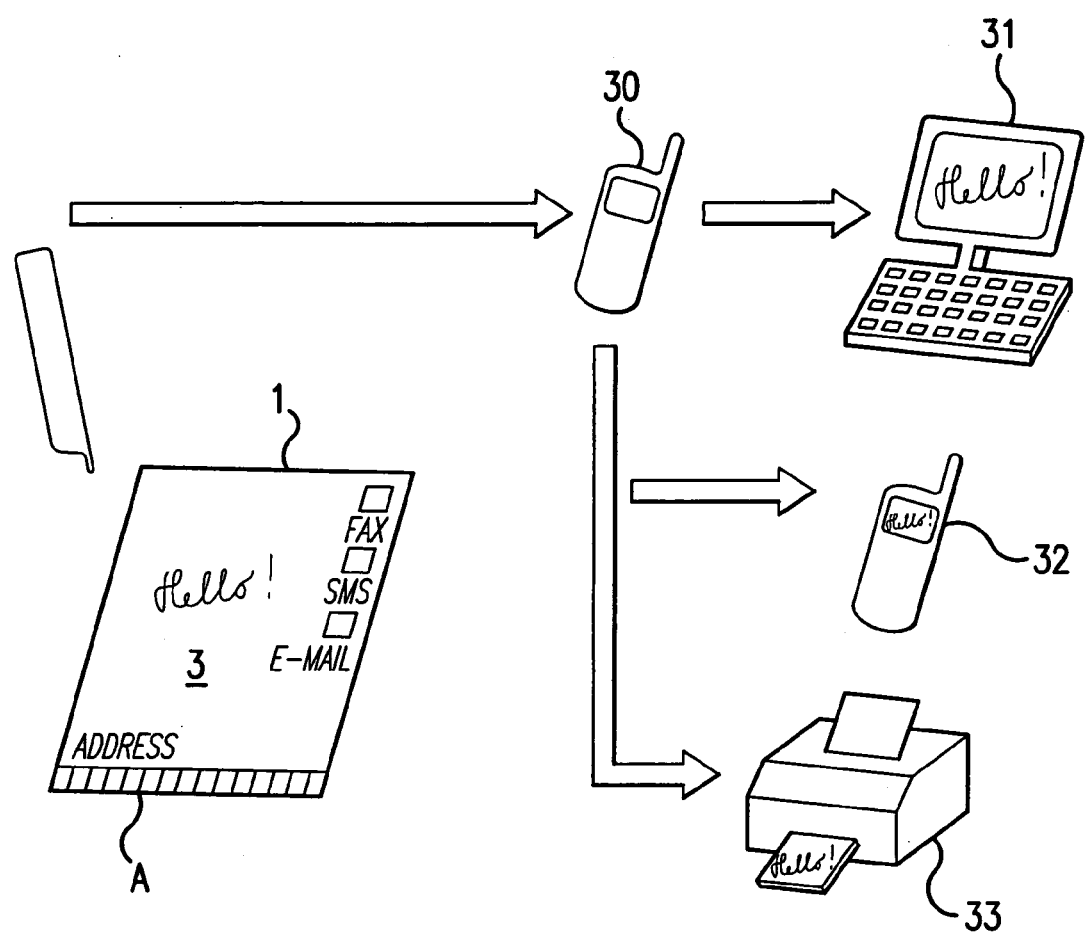
FIG. 7 shows schematically how a device according to the invention can communicate with external units.

Alternatively, the processor 16 can, as shown in the example in FIG. 7, communicate via the Bluetooth transceiver 20 with a mobile telephone 30 which works as a modem for the device, for further transmission of the information recorded from the writing surface 3 to, for instance, a computer 31, another mobile telephone 32 or a fax machine 33, whose address is indicated in the character recognition area A.

As a further alternative, the device can transmit the recorded information and the address information together with information about which operation is to be carried out to a neighboring computer which, for instance, arranges the information as an e-mail and sends it to the indicated address.

As yet another example, the device may comprise or be integrated with a mobile telephone transceiver so that it can carry out the operations which require direct communication.

As will be appreciated by a person skilled in the art, the processing of the images of the position code can be distributed in various ways among on the one hand the signal processor 16 in the device and, on the other hand, hardware and/or software in an external unit with which the device communicates. Such hardware and/or software which is adapted to carry out some of the tasks of the signal processor 16 is therefore considered to be part of the signal processor although it is not physically integrated therewith.

In the extreme case, the pen-shaped casing comprises according to FIG. 6 essentially only the optics part, the power supply, and the transceiver 20 which transmits the recorded images to another unit in a second casing which contains a suitably programmed processor which carries out the above-described processing of the images of the position code.

Now follow some concrete Examples of the use of the notepad sheet 1.

EXAMPLE 1

Now assume in this Example that the device in FIG. 6 is integrated with a mobile telephone. The device can be, for example, releasably attached to the mobile telephone. Also assume that a user receives a telephone call on the mobile telephone. She writes notes on the notepad 1 by means of the pen point 18 of the device. Assume, for example, that the person who calls wants the user to call Jack at a certain telephone number. The user then writes "Call Jack 9857299" on the notepad 1, as shown in FIG. 1.

When the user has finished her telephone conversation she places the device on the uppermost icon which looks like a telephone. When the device detects the telephone icon, it starts a program for dialing a telephone number with the aid of the mobile telephone. If all information written on the writing surface 3 is subjected to character recognition, the dialing program can fetch the figures of the telephone number directly from the recorded information. Alternatively, the user can write the figures in the character recognition area A, whereby they are automatically subjected to character recognition. The program shows the figures on the display 21 and waits for the user to confirm by pressing a button that the number is correct and that it should actually be dialed. After the confirmation, the number is dialed automatically and the user can speak to Jack.

Another example of how the notepad and the device can be used is as follows. The user remembers she is supposed to pick up her car at 4 p.m. at the garage. She writes a note on her notepad "pick up car at 4 p.m.", see FIG. 1, by means of the pen point 18 of the device. This information is recorded in the device by means of the position code. The user then places the pen on the calendar program icon 7e, whereupon the pen detects it and activates the calendar program. The program fetches the recorded information. Naturally, if the information is in the form of position indications it can only be stored as position indications in the calendar program. In this case, the program can suggest that the note be entered under today's date and ask the user to confirm this by pressing a button on the pen. However, if the information is in character-coded format, the program can interpret "p.m." as time indication and enter the note under this time and set an alarm.

The other activation icons can be used in a similar way.

The fax icon 7b can be used if the user wishes to send a fax. In this case, the user writes her fax message on the writing surface 3 and the fax address in the address area A and activates the fax program by means of the icon 7b. The fax program in the device then composes the fax automatically and sends it to the intended receiver, for example by using the mobile telephone 30 in FIG. 7 as a modem.

E-mail messages can be composed and sent correspondingly by activating the e-mail icon 7c. As an alternative to e-mail, SMS messages can be sent. In both cases, the contents of the message can either be converted to character-coded format or be sent in graphical format. Address information which need be subjected to character recognition to be able to be used by the device can be written in the character recognition area A. The title or subject of the e-mail message can also be written in the character recognition area so that it can be stated in the "title" of the message.

Information for an address book or a to-do-list can be managed in the same way as the information for the calendar program with the aid of the address book icon 7d and the to-do-list icon 7f.

As examples of further usable activation icons, mention can be made of a printer icon, which when detected makes the device initiate a print-out of the recorded information on a printer, and a storage icon which causes the device to store the recorded information in a predetermined location or in a location indicated by the user in the address area A, for instance in a notebook in the user's personal computer with which the device communicates. To this end, the device can have a storage program. Finally, certain notes can be removed from the memory of the pen with the aid of the recycle bin icon 7g.

The notepad sheet 1 shown in FIG. 1 can constitute part of a notepad with a plurality of sheets. In one embodiment, all sheets are identical. In another embodiment, at least the position code on the writing surface is different on the different sheets so that it is possible to distinguish notes made on different sheets from each other. One and the same activation icon can also be coded in different ways on different sheets to make it possible to identify to which sheet the activation icon belongs. As one more alternative, the user can herself in a suitable manner indicate on which sheet or in which area an operation is to be carried out, for instance by indicating a sheet number in an intended area adjacent to the activation icon.

The activation icons can be arranged on a part which is physically separated from the writing surface so that the activation icons can be used, for example, for a plurality of notepads.

EXAMPLE 2

Figure 8A:
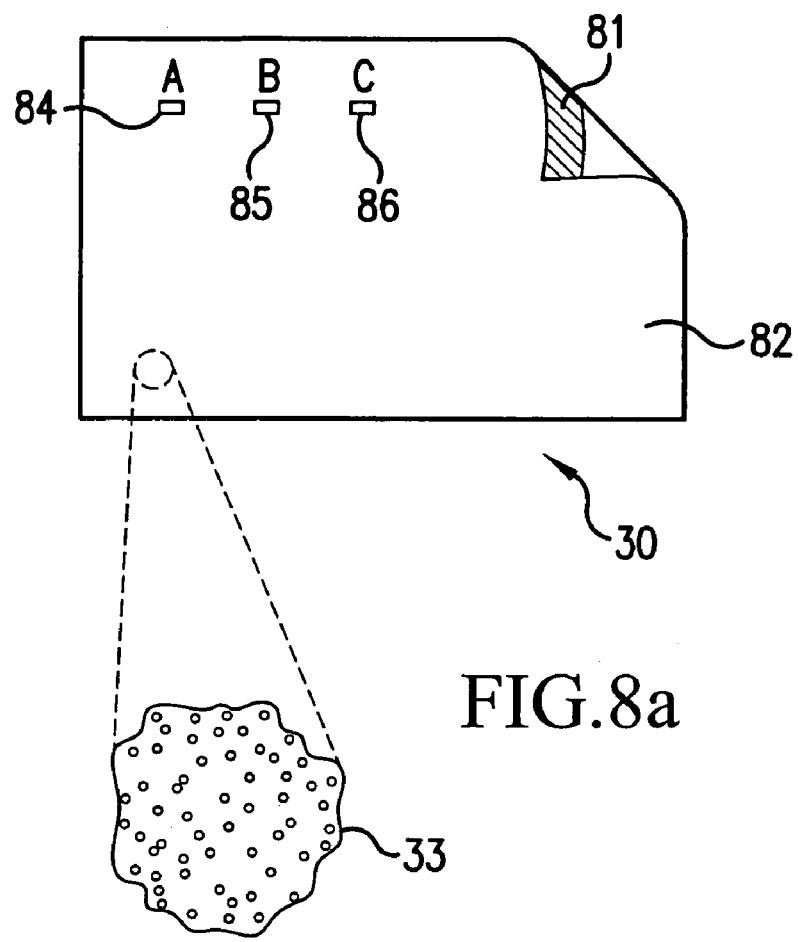
FIGS. 8*a* and 8*b* show a paper product according to a second embodiment of a product according to the invention.
Figure 8B:
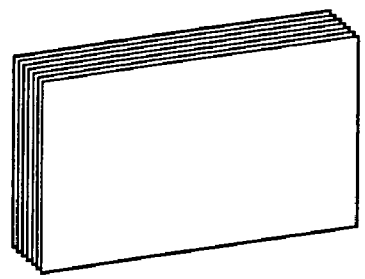

FIGS. 8a and 8b show paper products according to the invention. FIG. 8a shows a sheet 80, where part 81 of the surface of the rear of the sheet is coated with a weakly adhesive layer. The adhesion of the layer is sufficiently strong for the sheet 80 to be fixed to a plane vertical surface without coming loose by its own weight. Adhesion should simultaneously be sufficiently weak for the sheet 80 to be easily removed from the surface. Such adhesive materials are well known and used in so-called note blocks which are sold, for example, under the trademark POST-IT. The front of the sheet constitutes a writing surface 82. This is coated with a position-coding pattern 83 of the same type as described above. A plurality of activation icons 84, 85, 86 are printed on the writing surface with a function as the one described above. The activation icons can preferably be designed as boxes to be marked.

Preferably, a paper product, like the one described in connection with FIG. 8a, is manufactured and sold in blocks as shown in FIG. 8b. There a large number of essentially identical sheets of the type described above are joined in the form of a block by means of the weakly adhesive layers which are applied to the rear of each sheet. Preferably, however, the lowermost sheet of each block is free from adhesive material. The paper product can be used similarly to the notepad sheet described above (FIG. 1).

Figure 9A:
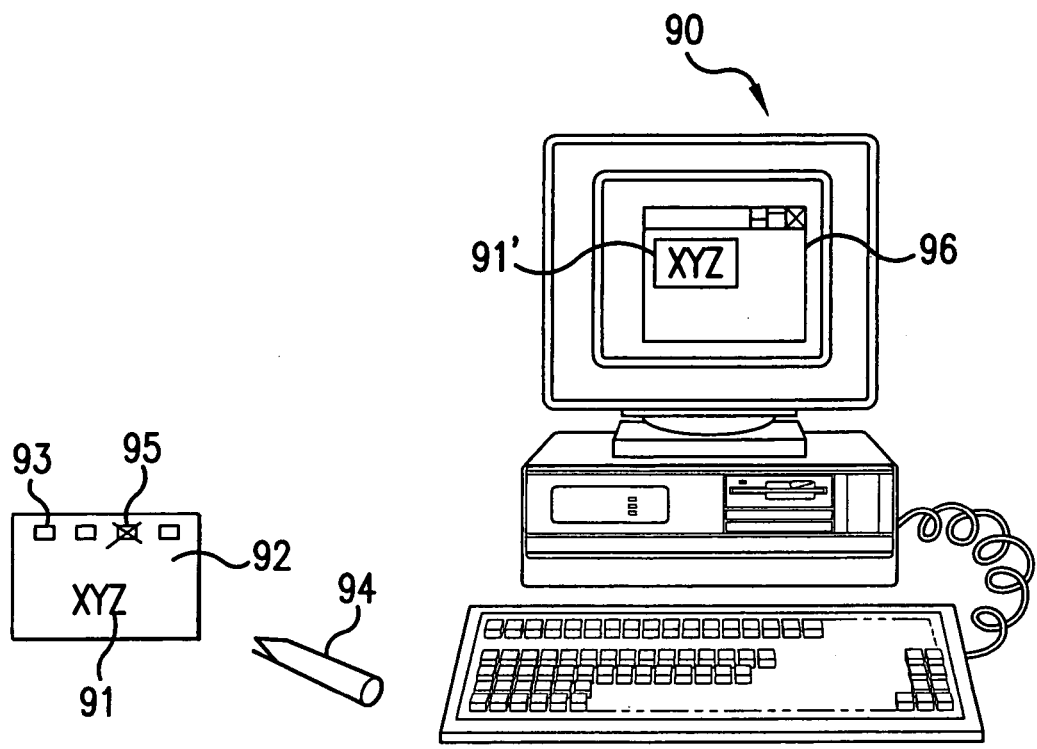
FIG. 9*a* shows the function of a computer program stored on a storage medium according to the invention.

FIG. 9a shows the function of a computer program, stored on a storage medium, according to the invention. This computer program preferably functions in connection with the paper product described above. In such cases, a computer program is provided for a computer system 90, which program is adapted to detect both graphical inputs 91 carried out on a writing surface 92, coated with a position code, and activation icons 93 positioned on or in connection with this writing surface 92. A graphical input is essentially the same as a digital representation of handwritten information.

The use of the computer program proceeds as follows: a user writes a graphical input 91 on the writing surface 92 by means of a pen point of a reading pen 94 of the type which is described with reference to FIG. 6 and which is capable of detecting the position code of the writing surface 92. The graphical input 91 is transmitted simultaneously in digital form, preferably as a polygon train representing the positions detected by the reading pen 94 when the graphical input 91 is being written on the writing surface 92, to the computer system 90 with the aid of e.g. a short-range radio link. Subsequently the user marks a certain activation icon 95 with a cross to indicate that the graphical input is to be associated with a certain application in the computer system 90. Also the position-coding pattern where the selected activation icon is positioned can be detected by the reading pen 94, and therefore also information corresponding to these positions is transmitted to the computer system 90. The computer system 90 can therefore determine which activation icon the user has chosen and consequently which application the user wants to associate with the graphical input 91. The computer system 90 is adapted then to reproduce the graphical input 91' in a window 96 belonging to the current application or associated therewith, for instance the neighboring one. The computer system 90 can also be integrated in the reading pen 94.

The user may herself configure the computer program in a number of ways. For instance, the user can by settings in the program link a certain activation icon or box on a base to a certain application in a computer system. The user can also allow more operations than the reproduction to be carried out. For instance, a message can be sent to another user while at the same time being shown in a window in an application in the computer system. It is also possible to link an activation icon to a plurality of applications in a computer system or to applications in several computer systems. The program can be varied and used in several ways similarly to that described above.

Figure 9B:
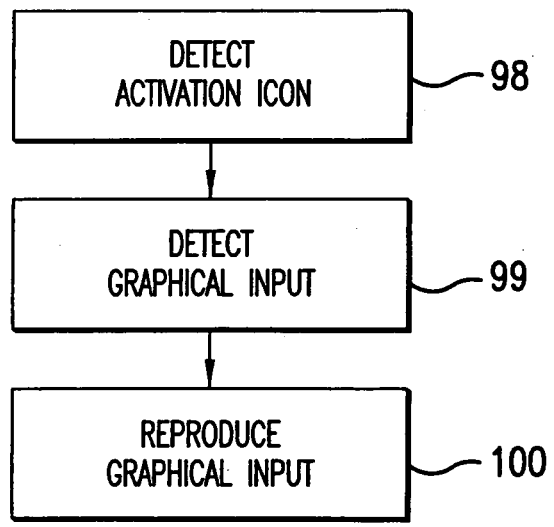
FIG. 9*b* is a block diagram which illustrates the steps corresponding to instructions of such a program.

FIG. 9*b* is a block diagram illustrating steps corresponding to instructions of such a program. In a first step 98, the computer system detects a certain activation icon of a product. In a second step 99, a graphical input is detected. The mutual sequence of the first and the second step is determined by the order in which a user makes a choice of activation icon and the carrying out of a graphical input. In a third step 100, the computer system reproduces the graphical input detected in the second step 99 in a program window associated with or belonging to an application associated with the activation icon recorded in the first step 98.

According to one more variant, the device in FIG. 6 can be controlled by means of activation icons which can be designed like those on the notepad sheet in FIG. 1, but concern operations of the type open and close programs and other operations which the user normally commands via the buttons 19 on the device. The function is exactly the same as described above except that no recorded information need be used to carry out the operations.

What we claim and desire to secure by Letters Patent is:

1. A product comprising:
   a surface;
   a writing position code region on said surface, said writing position code region having a first subset of a position codes provided thereon which codes a plurality of positions on the writing position code region to enable electronic recording of information which is being written on the writing surface position code region, by means of a device which detects the position codes; and
   at least one activation icon coded by a second subset of the position code representing said activation icon and coding at least one position, which activation icon, when detected by the device, causes the device to initiate a predetermined operation which utilizes the information recorded by the device from said writing position code region, the device detecting the activation icon by using information stored in the device's memory indicative of which positions belong to the writing position code region and the activation icon, respectively.

2. A product as claimed in claim 1, wherein the first subset of the position code codes region are codes coordinates forming a first coordinate area which is discontinuous with a second coordinate area formed by coordinates coded by the second subset of the position code.

3. A product as claimed in claim 1, wherein the position code is an absolute position codes, which codes coordinates for points on an imaginary surface, the second subset coding coordinates for at least one point on the imaginary surface, which point is dedicated to initiation of said operation.

4. A product as claimed in claim 1, wherein the position code is an absolute position code which codes coordinates for points on an imaginary surface, the first subset coding coordinates within an area on the imaginary surface, said area being dedicated to electronic recording of information.

5. A product as claimed in any one of claims 1, and 2–4, which product further comprises a character recognition area which is provided with a third subset of the position codes.

6. A product as claimed in claim 5, wherein the third subset of the position code codes coordinates within an area on the imaginary surface, said, area being dedicated to information, the characters of which are to be recognized.

7. A product as claimed in claim 1, wherein said at least one activation icon consists of a plurality of activation icons for initiating various predetermined operations.

8. A product as claimed in claim 1, wherein the position codes is optically detectable.

9. A product as claimed in claim 1, wherein the first and the second subsets of the position code are detectable by means of one and the same sensor.

10. A product as claimed in any one of claims 1, and 7–9, wherein the predetermined operation is an operation from the following group: dialing a telephone number included in the recorded information, sending a fax containing the recorded information, sending an electronic message containing the recorded information, writing address information included in the recorded information in an electronic address book, entering calendar information included in the recorded information in an electronic calendar, entering a task included in the recorded information in an electronic list, printing the recorded information using a printer, and storing the recorded information at a predetermined location.

11. A product as claimed in any one of claims 1, and 7–9, wherein each position is coded by a plurality of symbols and wherein each symbol contributes to the coding of more than one position.

12. A product as claimed in any one of claims 1, and 7–9, wherein the position code comprises a raster and a plurality of substantially similar markings, each of which is displaced in relation to a respective nominal position defined by the raster to code the positions of the position code.

13. A product as claimed in any one of claims 1, and 7–9, said product being a notepad with a plurality of writing position code regions.

14. A product as claimed in claim 13, wherein the position code on the various writing position code regions code different positions.

15. A product as claimed in any one of claims 1, and 7–9, which product is a paper product consisting of at least one sheet comprising said writing surface on which the writing position code region is provided, at least part of a another surface of the sheet being coated with a preferably weakly adhesive layer.

16. A product as claimed in claim 15, wherein the writing position code region and the adhesive layer are located on opposite sides of the sheet.

17. A product as claimed in claim 15, wherein the product comprises a plurality of essentially identical sheets.

18. The product of claim 1, wherein the first subset of the position code codes coordinates forming a first coordinate area which is continuous with a second coordinate area formed by coordinates coded by the second subset of the position code.

19. The product of claim 1, further comprising an activation icon being used to qualify the recorded information.

20. An information management device for electronically recording information that is being written on a writing surface, the writing surface being provided with a first subset of a position code, which codes a plurality of positions on the writing surface, comprising:
a pen for moving across the writing surface and for interacting with an activation icon, which is provided with a second subset of the position code, which codes at least one position on the activation icon;
a reader mounted for movement with the pen for reading said position code while the pen is moving across the writing surface and when the pen is interacting with the activation icon;
a memory mounted for movement with the pen and storing information indicative of which positions are coded on the writing surface and the activation icon, respectively:
processing circuitry mounted for movement with the pen for using the position codes read by said reader from the writing surface to develop pen path information, said processing circuitry identifying when said pen interacts with the activation icons by using the information stored in the memory, to produce a signal to initiate a predetermined operation which utilizes the pen path information.

21. A device as claimed in claim 20, wherein said reader includes at least one sensor for the reading of the position code.

22. A device as claimed in claim 21, wherein the device comprises a single sensor for the reading of the first and second subsets of the position code.

23. A device as claimed in claim 20, 21 or 22, wherein said processing circuitry includes a character recognition function which is adapted to convert at least part of the recorded pen path information to character-coded format.

24. A device as claimed in any one of claims 20, 21, or 22, wherein the device comprises a memory for storing the recorded pen path information.

25. A device as claimed in any one of claims 20, 21, or 22, wherein the device is adapted to utilize, in the initiation of the predetermined operation, that part of the pen path information which has been recorded from the writing surface during a predetermined period.

26. A device as claimed in any one of claims 20, 21, or 22, wherein the device is adapted to utilize, in the initiation of the predetermined operation, pen path information that has been recorded in a predetermined area on the writing surface.

27. A device as claimed in any one of claims 20, 21, or 22, wherein the device comprises a transceiver for wireless short-range communication.

28. A device as claimed in any one of claims 20, 21, or 22, further comprising a mobile telephone transceiver for transferring the recorded pen path information from the device to an external unit, the predetermined operation being an operation from the following group: dialing a telephone number included in the recorded pen path information, sending a fax containing the recorded pen path information, sending an electronic message with text with the recorded information, printing the recorded Den path information using a printer, and transferring the recorded pen path information to a drawing program.

29. A device as claimed in any one of claims 20, 21, or 22, wherein the device comprises at least one computer program of the type address book program or calendar program or to-do-list program, the predetermined operation consisting of entering a piece of information contained in the recorded pen path information in a register for use in one of said computer programs.

30. A device as claimed in any one of claims 20, 23, or 22 which device is handheld.

31. A device as claimed in any one of claims 20, 21, or 22 further comprising a pen point for writing the pen path information on the writing surface while being recorded electronically.

32. A device as claimed in any one of claims 20, 21, or 22 further comprising means for providing a feedback signal to the user when the device detects said at least one activation icon.

33. A device as claimed in any one of claims 20, 21, or 22 further comprising means for indicating when the device detects the position code.

34. A device as claimed in claim 20, in which the processing circuitry is arranged to initiate the predetermined operation by transferring the pen path information together with an indication of the predetermined operation to an external unit.

35. A device as claimed in claim 34, in which the processing circuitry is arranged to carry out the transfer to the external unit immediately after having identified pen interaction with the activation icon.

36. A device as claimed in claim 34, in which the processing circuitry is arranged to retain the pen path information after having identified pen interaction with the activation icon and to carry out the transfer to the external unit at a later occasion.

37. The information management device of claim 20, wherein each position is coded by a plurality of symbols and wherein each symbol contributes to the coding of more than one position.

38. The information management device of claim 20, wherein the position code comprises a raster and a plurality of substantially similar markings, each of which is displaced in relation to a respective nominal position defined by the raster to code the positions of the position code.

39. In a system wherein a pen provided with a position code reader reading a position code provided on a writing surface and on an activation icon representative of an order for an computer controlled action, a computer program for information management, which is stored on a computer-readable storage medium provided in the pen when used and which performs the steps of:

receiving, as an input signal, a plurality of positions obtained from said position code, using information in a memory of the pen indicative of which positions are coded by the position code on the writing surface and on the activation icon, respectively, to establish whether positions received in the input signal belong to the writing surface or the activation icon, processing positions belonging to the writing surface as representing information written by the pen on the writing surface; and interpreting a position belonging to the activation icon as a command to initiate a predetermined operation which utilizes the information written on the writing surface.

40. The computer program of claim 39, wherein each position is coded by a plurality of symbols and wherein each symbol contributes to the coding of more than one position.

41. The computer program of claim 39, wherein the position code comprises a raster and a plurality of substantially similar markings, each of which is displaced in relation to a respective nominal position defined by the raster to code the positions of the position code.

42. A system for information management, comprising:

a sensing wand adapted to record information electronically by using position information obtained from a first subset of a position codes provided on a writing region and to detect interaction with at least one activation icon by using position information obtained from a second subset of the position code with which the activation icon is provided;

a memory in said sensing wand, which stores information indicative of positions coded on the writing region and the activation icon by said first and second subset, respectively; and a sensed product, said product supplying the position information to said sensing wand and being provided with the writing region and said at least one activation icon, the sensing wand being adapted to initiate the predetermined operation for the recorded information obtained from the writing region in response to the detection of said at least one activation icon code, said detection occurring when the sensing wand establishes that position information received from the sensed product corresponds to a position coded on the activation icon by the second subset of the position code.

43. The system of claim 42, wherein each position is coded by a plurality of symbols and wherein each symbol contributes to the coding of more than one position.

44. The system of claim 42, wherein the position code comprises a raster and a plurality of substantially similar markings, each of which is displaced in relation to a respective nominal position defined by the raster to code the positions of the position code.

45. A method for interacting with information written on a writing surface provided with a first subset of a position code coding positions on the writing surface and at least one activation icon provided with a second subset of the position code coding at least one position on the activation icon, the activation icon being representative of a computer function, comprising:

using a position code reader to read the position code on the writing surface and the at least one activation icon in order to record the information written on the writing surface and to actuate the activation icon, decoding the read position code to positions, using pre-stored information indicative of which positions are coded on the writing surface and the at least one activation icon by the first and second subset, respectively, to determine if decoded positions belong to the writing surface or the activation icon, processing decoded positions belonging to the writing surface as information written on said writing surface;

processing a decoded position belonging to the activation icon as an actuation of said activation icon and issuing an instruction to initiate the computer function the activation icon represents;

said steps of decoding, using and processing being performed within a device including said position code reader:

receiving said instruction and initiating the computer function the activation icon represents in response thereto;

said computer function utilizing the information recorded from the writing surface:

said step of receiving and initiating being performed in a digital computer located remotely from said position code reader.

46. The method of claim 45 wherein said digital computer performs the step of displaying the handwritten information as an image in a program window associated with an application in said computer in response to actuation of said activation icon.

47. The method of claim 45, wherein each position is coded by a plurality of symbols and wherein each symbol contributes to the coding of more than one position.

48. The method of claim 45, wherein the position code comprises a raster and a plurality of substantially similar markings, each of which is displaced in relation to a respective nominal position defined by the raster to code the positions of the position code.

49. A system for interacting with information written on a writing surface provided with a first subset of a position code coding positions on the writing surface and at least one activation icon provided with a second subset of the position code coding at least one position on the activation icon, said activation icon being representative of a computer function, comprising:

a pen provided with a position code reader obtaining position indications from the position code on the writing surface and the activation icon in order to record the information written on the writing surface and to actuate the activation icon, a processor system including:

a first processor portion collocated with the pen and having a memory which stores information indicative of positions coded on the writing surface and on the activation icon by the first and second subset, respectively, of the position code, said first processor portion processing obtained position indications indicating positions belonging to the writing surface as information written on said writing surface, and processing an obtained position indication indicating a position belonging to the activation icon as an actuation of said activation icon and issuing an instruction to initiate the computer function the activation icon represents;

a second processor portion receiving said instruction generated by said first processor portion and initiating the computer function the activation icon represents, said computer function utilizing the information recorded from writing surface.

50. The system of claim 49 wherein the handwritten information is displayed as an image in a program window associated with an application in digital computer located remotely from the processor system in response to actuation of said activation icon.

51. The system of claim 49, wherein each position is coded by a plurality of symbols and wherein each symbol contributes to the coding of more than one position.

52. The system of claim 49, wherein the position code comprises a raster and a plurality of substantially similar markings, each of which is displaced in relation to a respective nominal position defined by the raster to code the positions of the position code.

* * * * *

UNITED STATES PATENT AND TRADEMARK OFFICE
CERTIFICATE OF CORRECTION

| | | |
|---|---|---|
| PATENT NO. | : 7,176,896 B1 | |
| APPLICATION NO. | : 09/652838 | |
| DATED | : February 13, 2007 | |
| INVENTOR(S) | : Christer Fahraeus et al. | |

It is certified that error appears in the above-identified patent and that said Letters Patent is hereby corrected as shown below:

Claim 1, Column 23, Line 62:

The word ""codes"" should be --code--.

Claim 1, Column 23, Line 67:

The word ""codes"" should be --code--.

Claim 2, Column 24, Line 13:

Please delete the words ""codes region are"".

Claim 3, Column 24, Line 18:

The word ""codes"" should be --code--.

Claim 5, Column 24, Line 29:

The word ""codes"" should be --code--.

Claim 8, Column 24, Line 38:

The word ""codes"" should be --code--.

Claim 20, Column 25, Line 40:

The word ""codes"" should be --code--.

Claim 28, Column 26, Line 15:

The word ""Den"" should read --pen--.

Claim 30, Column 26, Line 25:

The words ""claims 20, 23, or 22"" should be --claims 20, 21, or 22--.

Claim 42, Column 27, Line 26:

The word ""codes"" should be --code--.

UNITED STATES PATENT AND TRADEMARK OFFICE
CERTIFICATE OF CORRECTION

PATENT NO. : 7,176,896 B1
APPLICATION NO. : 09/652838
DATED : February 13, 2007
INVENTOR(S) : Christer Fahraeus et al.

It is certified that error appears in the above-identified patent and that said Letters Patent is hereby corrected as shown below:

Claim 42, Column 27, Line 41:

Please delete ""code"".

Claim 50, Column 28, Line 65:

Please insert --a-- before ""digital computer"".

Signed and Sealed this

Twenty-seventh Day of November, 2007

JON W. DUDAS
*Director of the United States Patent and Trademark Office*